(12) United States Patent
Isoda (10) Patent No.: US 7,009,191 B2
(45) Date of Patent: Mar. 7, 2006

(54) PREPARATION OF STIMULABLE PHOSPHOR SHEET

(75) Inventor: Yuji Isoda, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/761,238

(22) Filed: Jan. 22, 2004

(65) Prior Publication Data

US 2004/0149931 A1    Aug. 5, 2004

Related U.S. Application Data

(63) Continuation of application No. 09/870,679, filed on Jun. 1, 2001.

(30) Foreign Application Priority Data

| Jun. 1, 2000 | (JP) | ............................. 2000-164841 |
| Jul. 4, 2000 | (JP) | ............................. 2000-202497 |
| Sep. 29, 2000 | (JP) | ............................. 2000-299002 |
| Sep. 29, 2000 | (JP) | ............................. 2000-299003 |

(51) Int. Cl.
    *G03B 42/08*    (2006.01)

(52) U.S. Cl. .................................. 250/483.1

(58) Field of Classification Search .............. 250/483.1
See application file for complete search history.

(56) References Cited

U.S. PATENT DOCUMENTS

| 4,947,046 A | 8/1990 | Kawabata et al. |
| 4,963,751 A | 10/1990 | Kano et al. |
| 5,023,461 A | 6/1991 | Nakazawa et al. |
| 5,055,681 A | 10/1991 | Tsuchino et al. |
| 5,789,021 A | 8/1998 | Dooms et al. |
| 6,031,236 A | 2/2000 | Arakawa et al. |
| 2002/0041977 A1 | 4/2002 | Iwabuchi et al. |
| 2002/0104974 A1 | 8/2002 | Hosoi |
| 2002/0139937 A1 | 10/2002 | Hosoi |
| 2002/0158216 A1 | 10/2002 | Neriishi et al. |

*Primary Examiner*—Otilia Gabor
(74) *Attorney, Agent, or Firm*—Sughrue Mion, PLLC

(57) ABSTRACT

A stimulable phosphor sheet is prepared by applying an electron beam to a stimulable phosphor or its source in a vacuum to vaporize a phosphor or its source and depositing the vaporized phosphor or source on the support, under the condition that the electron beam is applied to the stimulable phosphor or source at an accelerating voltage of 1.5 kV to 5.0 kV. The stimulable phosphor or its source is preferably in the form of a solid having a relative density of 80% to 98%.

5 Claims, 6 Drawing Sheets

PREPARATION OF STIMULABLE PHOSPHOR SHEET

This is a continuation of application Ser. No. 09/870,679 filed Jun. 1, 2001; the disclosure of which is incorporated herein by reference.

FIELD OF THE INVENTION

The present invention relates to a stimulable phosphor sheets employable in a radiation image recording and reproducing method utilizing stimulated emission from a stimulable phosphor.

BACKGROUND OF THE INVENTION

As a method replacing a conventional radiography using a combination of a radiographic film and radiographic intensifying screens, a radiation image recording and reproducing method utilizing a stimulable phosphor was proposed and has bee practically employed. This method employs a radiation image storage panel comprising a stimulable phosphor layer (i.e., stimulable phosphor sheet) provided on a support, and the procedure of the method comprises the steps of causing the stimulable phosphor in the phosphor sheet to absorb radiation energy having passed through an object or having radiated from an object; sequentially exciting the stimulable phosphor with stimulating rays to release the radiation energy stored in the phosphor sheet as light emission (i.e., stimulated emission); photoelectrically detecting the emitted light to obtain electric signals; and reproducing the radiation image of the object as a visible image from the electric signals. The stimulable phosphore sheet thus processed is subjected to a step for erasing a radiation image remaining therein, and then stored for the next recording and reproducing procedure. Thus, the radiation image storage panel can be repeatedly employed.

Generally, a substrate film and a protective cover film are provided on the top and bottom surfaces of the stimulable phosphor sheet, respectively. The stimulable phosphor sheet generally comprises a binder and stimulable phosphor particles dispersed therein, but it may consist of agglomerated phosphor with no binder. The phosphor sheet containing no binder can be formed by deposition process or sintering process. Further, the sheet comprising agglomerated phosphor soaked with a polymer is also known. In the aforementioned method, any types of the stimulable phosphor sheets are employable.

The radiation image recorded in the stimulable phosphor sheet is generally read by the steps of applying stimulating rays onto the front surface side (phosphor layer side) of the phosphor sheet, collecting light emitted by the phosphor particles by Weans of a light-collecting means from the same side, and photoelectrically converting the light into image signals. A system for reading the image from one side of the panel in this manner is referred to as "single-side reading system". However, there is a case that the light emitted by the phosphor particles should be collected from both sides (i.e., front and the back surface sides) of the phosphor sheet. For instance, there is a case that the emitted light is desired to be collected as much as possible. There also is a case that the radiation image recorded in the phosphor layer varies along the depth of the layer, and it is desired to detect the variation. A system for reading the image from both sides of the phosphor sheet is referred to as "double-side reading system".

The radiation image recording and reproducing method is often used in radiography for medical diagnosis. In that case, it is especially desired to reproduce a radiation image of high quality (particularly, high sharpness for high resolution) by applying a small dose of radiation. Thus, the stimulable phosphor sheet is required to have a high sensitivity and to provide an image of high quality.

In radiography for medical diagnosis, the use of a stimulable phosphor sheet of high sensitivity can reduce a dose of radiation to be applied to a patient Therefore, it is required to provide a stimulable phosphor sheet giving an image of high sharpness with high sensitivity.

Japanese Patent Provisional Publication No. 62-47600 describes a method for preparing a stimulable phosphor sheet comprising a support and a stimulable phosphor layer deposited thereon which comprises applying an electron beam to a stimulable phosphor in a vacuum to vaporize the phosphor and depositing the vaporized phosphor or source on the support, so as to columnar crystals of the stimulable phosphor on the support. The stimulable phosphor layer thus deposited on a support has cracks between each of the columnar crystals, and therefore it gives a radiation image with high sensitivity and high sharpness. In this publication, a stimulable phosphor to be deposited (such as RbBr:Tl phosphor) is pressed by a hot press to become a shaped article such as crucible. However, there are no teaching as to the pressure and a density of the pressed article. According to technical manuals of commercially available apparatuses of deposition using electron beam such as those supplied by ANELVA Corporation, ULVAC Corporation, and JEOL Corporation, the accelerating voltage of the electron beam adopted generally is in the range of 6 kV to 10 kV, or higher than 10 kV.

Japanese Patent Publication 5-17170 teaches that a method for preparing a zinc sulfide thin film for an anti-reflection of an optical lens or electroluminescent element. According to the description, a sintered zinc sulfate having a high density and a large particle size is favorably employed for preparing the film containing neither fine particles nor pin holes.

Japanese Utility Model Publication 62-173100 indicates a structure of a stimulable phosphor sheet in which a protective film is fixed onto a whole surface the phosphor layer using an adhesive. It also describes that a spacer can be placed between the support and the protective layer so as to enclose the phosphor layer with the spacer.

It is an object of the invention to provide a stimulable phosphor sheet which is able to give a radiation image with improved image quality.

Specifically, the invention has an object to give methods favorably employable for preparing a stimulable phosphor sheet which is able to give a radiation image with improved image quality.

SUMMARY OF THE INVENTION

The invention resides in a method for preparing a stimulable phosphor sheet comprising a support and a stimulable phosphor layer deposited thereon which comprises applying an electron beam to a stimulable phosphor or a source thereof in a vacuum to vaporize the phosphor or the source and depositing the vaporized phosphor or source on the support, wherein the stimulable phosphor or source to be vaporized is in the form of a solid having a relative density in the range of 80% to 98%.

The invention further resides in a method for preparing a stimulable phosphor sheet comprising a support and a stimulable phosphor layer deposited thereon which comprises applying an electron beam to a stimulable phosphor or a source thereof in a vacuum to vaporize the phosphor or the source and depositing the vaporized phosphor or source on the support, wherein the electron beam is applied to the stimulable phosphor or source thereof at an accelerating voltage in the range of 1.5 kV to 5.0 kV.

The invention furthermore resides in a method for preparing a stimulable phosphor sheet comprising a support and a stimulable phosphor layer deposited thereon which comprises applying an electron beam to a stimulable phosphor or a source thereof in a vacuum to vaporize the phosphor or the source and depositing the vaporized phosphor or source on the support, wherein the support is heated by a thermal energy supplied by a heating means when the vaporized phosphor or source is deposited and, after the deposition is complete, the supply of thermal energy from the heating means to the support is gradually reduced to cool the support gradually.

DETAILED DESCRIPTION OF THE INVENTION

The methods of the present invention for preparing a stimulable phosphor sheet is explained below in more detail.

As described hereinbefore, a method for preparing a stimulable phosphor sheet comprising a support and a stimulable phosphor layer deposited thereon which comprises applying an electron beam to a stimulable phosphor or a source thereof in a vacuum to vaporize the phosphor or the source and depositing the vaporized phosphor or source on the support is known.

In one aspect, the method of the invention is characteristic in that the stimulable phosphor or its source to be vaporized is in the form of a solid having a relative density in the range of 80% to 98%, preferably 90% to 96%. The solid of the stimulable phosphor or its source is favorably produced by compressing a powdery phphohor or a powdery composition of component materials for the desired stimulable phosphor.

In another aspect, the method of the invention is characteristic in that the electron beam is applied to the stimulable phosphor or source thereof at an accelerating voltage in the range of 1.5 kV to 5.0 kV, preferably 2.0 kV to 4.0 kV.

It is most preferred that the electron beam is applied to the stimulable phosphor or its source in the form of a solid having a relative density in the range of 80% to 98% (preferably 90% to 96%) at an accelerating voltage in the range of 1.5 kV to 5.0 kV (preferably 2.0 kV to 4.0 kV).

As the stimulable phosphor, a phosphor giving a stimulated emission of a wavelength in the region of 300 to 500 nm when it is irradiated with stimulating rays of a wavelength in the region of 400 to 900 nm is preferably employed. In Japanese Patent Provisional Publications No. 2-193100 and No. 4-310900, some examples of the stimulable phosphors are described in detail.

As the stimulable phosphor or its source to be vaporized, a stimulable alkali metal halide phosphor having an essential composition of the following formula (1) is preferred:

$$M^I X \cdot aM^{II} X'_2 \cdot bM^{III} X''_3 : zA \qquad (I)$$

in which $M^I$ represents at least one alkali metal selected from the group consisting of Li, Na, K, Rb and Cs; $M^{II}$ represents at least one divalent metal selected from the group consisting of Be, Mg, Ca, Sr, Ba, Ni, Cu, Zn and Cd; $M^{III}$ represents at least one trivalent metal selected from the group consisting of Sc, Y, La, Ce, Pr, Nd, Pm, Sm, Eu, Gd, Tb, Dy, Ho, Er, Tm, Yb, Lu, Al, Ga and In; each of X, X' and X" independently represents at least one halogen atom selected from the group consisting of F, Cl, Br and I; A represents at least one metal selected from the group consisting of Y, Ce, Pr, Nd, Sm, Eu, Gd, Tb, Dy, Ho, Er, Tm, Yb, Lu, Na, Mg, Cu, Ag, Tl and Bi; and each of a, b and z is a number respectively satisfying the conditions of $0 \leq a < 0.5$, $0 \leq b < 0.5$, $0 \leq z < 0.2$.

In the formula (I), it is preferred that $M^I$ preferably is Cs or a combination of Cs and one or more other alkali metals; X preferably is Br or a combination of Br and one or more other halogen atoms; and A preferably is Eu or Bi. The stimulable phosphor of the formula (I) may contain one or more metal oxides such as aluminum oxide, silicon dioxide, or zirconium oxide, in an amount of 0.5 mol. per one mol. of $M^I$.

Stimulable rare earth metal activated alkaline earth metal fluorohalide phosphors having the following essential formula (II) are also preferred:

$$M^{II} FX : zLn \qquad (II)$$

in which $M^{II}$ is an alkaline earth metal such as Ba, Sr, or Ca; Ln is a rare earth metal such as Ce, Pr, Sm, Eu, Tb, Dy, Ho, Nd, Er, Tm, or Yb; X is a halogen atom such as Cl, Br, or I; and z is a value satisfying the condition of $0 < z \leq 0.2$.

$M^{II}$ of the formula (II) preferably comprises Ba in an amount of 50 atomic % or more. Ln preferably is Eu or Ce. It should be noted that the formula (II) does not mean F:X=1:1, but means to have a crystalline structure of BaFX. Thus, the formula (II) does not accurately indicate stoichiometric amounts of the constitutional elements. It is generally preferred that F is slightly rich in comparison with X, because $F^+$ center ($X^-$ center) produced in such composition efficiently gives a stimulated emission when the phosphor is stimulated with a light in the region of 600 to 700 nm.

The stimulable phosphor of the formula (II) can further contain one or more of the following additive components:

bA, wN$^I$, xN$^{II}$, yN$^{III}$

In the above formulas, A is a metal oxide such as Al$_2$O$_3$, SiO$_2$ or ZrO$_2$, in which source of the metal oxide preferably is extremely fine particles having a mean diameter (of primary particles) of 0.1 μm or less and has little reactivity to M$^{II}$FX particles to keep the M$^{II}$FX particles from coagulation; N$^I$ is a compound of an alkali metal such as Li, Na, K, Rb, or Cs; N$^{II}$ is a compound of an alkaline earth metal such as Mg and/or Be; and N$^{III}$ is a compound of a monovalent or trivalent metal such as Al, Ga, In, Ti, Sc, Y, La, Gd, or Lu. The metal compounds preferably are halide compounds such as those described in Japanese Patent Provisional Publication No.59-75200.

In the formulas, each of b, w, x, and y is a value which means an amount of each source material, based on one molar amount of M$^{II}$FX, under the conditions of $0 \leq b \leq 0.5$, $0 \leq w \leq 2$, $0 \leq x \leq 0.3$, and $0 \leq b \leq 3$. Accordingly, the value of b, w, x, or y does not necessarily mean the amount of each element or compound existing in the finally produced phosphor. Further, each additive compound may exist as such in the finally produced phosphor or may react with M$^{II}$FX in the course of the preparation of the stimulable phosphor.

Furthermore, the stimulable phosphor of the formula (II) may contain one or more of the following compounds or reaction products thereof:

Compounds of Zn and Cd described in Japanese Patent Provisional Publication No. 55-12145;

Metal oxides such as TiO$_2$, BeO, MgO, CaO, SrO, BaO, ZnO, Y$_2$O$_3$, La$_2$O$_3$, In$_2$O$_3$, GeO$_2$, SnO$_2$, Nb$_2$O$_5$, Ta$_2$O$_5$, and ThO$_2$ described in Japanese Patent Provisional Publication No. 55-160078;

Compounds of Zr and Sc described in Japanese Patent Provisional Publication No. 56-116777;

Compounds of B described in Japanese Patent Provisional Publication No. 57-23673;

Compounds of As and Si described in Japanese Patent Provisional Publication No. 57-23675;

Tetrafluoroborate compounds described in Japanese Patent Provisional Publication No. 59-27980;

Hexafluoro compounds such as monovalent or divalent salts of hexafluorosilicic acid, hexafluorotitanic acid, or hexafluorozirconic acid described in Japanese Patent Provisional Publication No. 59-47289; and Compounds of transitional metals such as V, Cr, Mn, Fe, Co, and Ni described in Japanese Patent Provisional Publication No. 59-56480.

Moreover, other additives may be incorporated, provided that the incorporated additives do not disturb the preparation of the essential phosphor composition of the formula (I) or (II).

As described hereinbefore, the stimulable phosphor or its source composition to be vaporized preferably is in the form of a solid (e.g., pellet) having a relative density of 80 to 98%, more preferably 90 to 96%. A solid of the phosphor or its source composition can be produced by compression of a powdery material at a pressure of 800 to 1,000 kg/cm$^2$. The compression can be performed at a temperature of 50 to 200° C. The compressed material is preferably degassed.

In the beginning of the method of vaporizing the phosphor material (such as a stimulable phosphor or its source composition) and depositing the vaporized phosphor material, the phosphor material as well as a support on which the phosphor material is deposited are placed in a vessel for deposition. The phosphor material is generally placed in a crucible. The vessel can be evacuated.

The support should be heat-resistant and may be transparent. Accordingly, the support employed in the preparing method of the invention is selected from those known as support materials of the conventional stimulable phosphor sheets. Preferred are quartz sheet, silicate glass sheet, sheets of metals such as aluminum, iron, tin, and chromium, and heat-resistant resin sheets such as an aramide sheet. Most preferred are quartz sheet and metal sheet. The support preferably has a thickness in the range of 50 μm to 1 mm. The support can have a light-reflective layer or a light-absorbing layer on one surface side, so as to increase the sensitivity of the phosphor layer. The support may have a great number of concaves on its surface.

Figure 4:
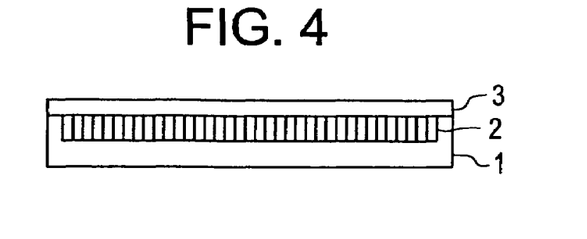
FIG. 4 illustrates an example of the structure of the stimulable phosphor sheet of the invention.
Figure 5A:
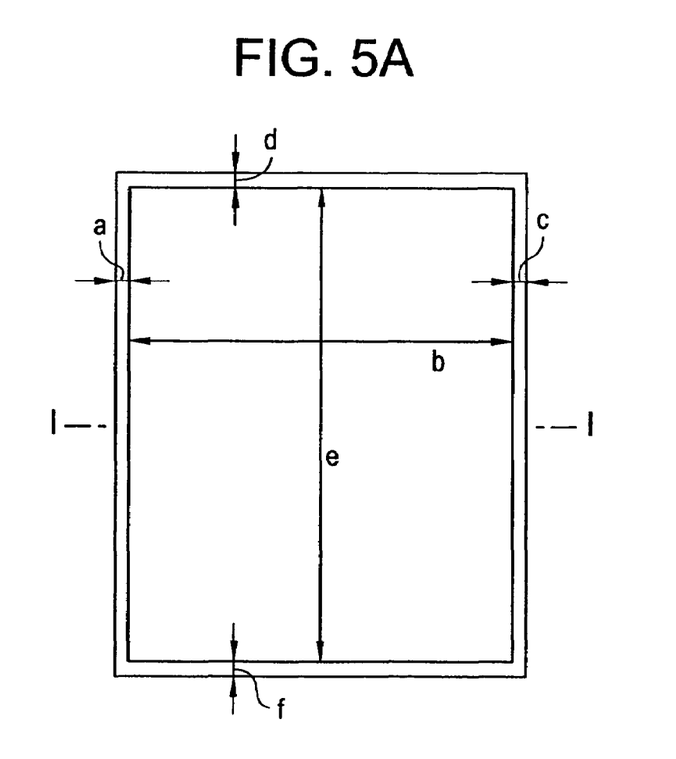
FIG. 5 illustrates an example of a support of a stimulable phosphor sheet of the invention in which (1) is for a plane view and (2) is for a section view.
Figure 5B:
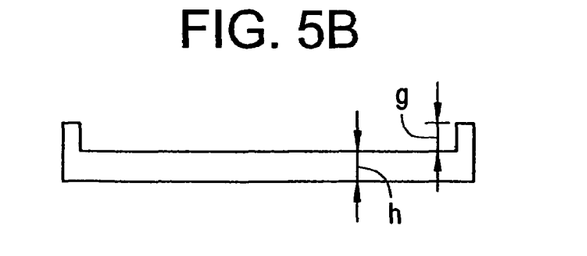

In one aspect, as seen in FIG. 4, the support 1 preferably has a frame unitedly protruded from a circumference of the support 1, and the phosphor layer 2 is enclosed with the frame. A protective film 3 is airtightly sealed to the frame. FIG. 5-(1) is a plane view of the stimulable phosphor sheet of FIG. 4, and FIG. 5-(2) is a side view of the support 1. The widths (a, c, d, f) of the frame generally is in the range of 1 to 100 mm, preferably 10 to 30 mm. The inner dimensions (b, e) of the support are determined to have dimensions of 1.1 times or more (preferably 1.2 times or more) as much as the corresponding dimensions of the area on which the radiation image is formed. For instance, b and e is in the range of 10 to 100 cm. The height (g) of the frame generally is in the range of 50 to 1,000 μm, preferably 200 to 700 μm. The thickness of the support (h) generally is 0.1 to 10 mm, preferably 0.5 to 5 mm.

The vessel for deposition containing the phosphor material and the support is then evacuated to reach a pressure of $3 \times 10^{-3}$ to $3 \times 10^{-12}$ kg/cm$^2$. An inert gas such as Ar gas or Ne gas may be introduced into the vessel, maintaining such low pressure in the vessel.

For the vaporization and deposition, an electron beam is emitted from an electron gun attached to the vessel. The electron beam is preferably emitted at an accelerating voltage of 1.5 kV to 5.0 kV, more preferably 2.0 kV to 4.0 kV. The vaporization of the phosphor material at such low-accelerating voltage is favorably adopted because it gives a deposited phosphor layer in which columnar phosphor crystals of almost same sizes are neatly aligned almost vertically on the support.

Figure 1:
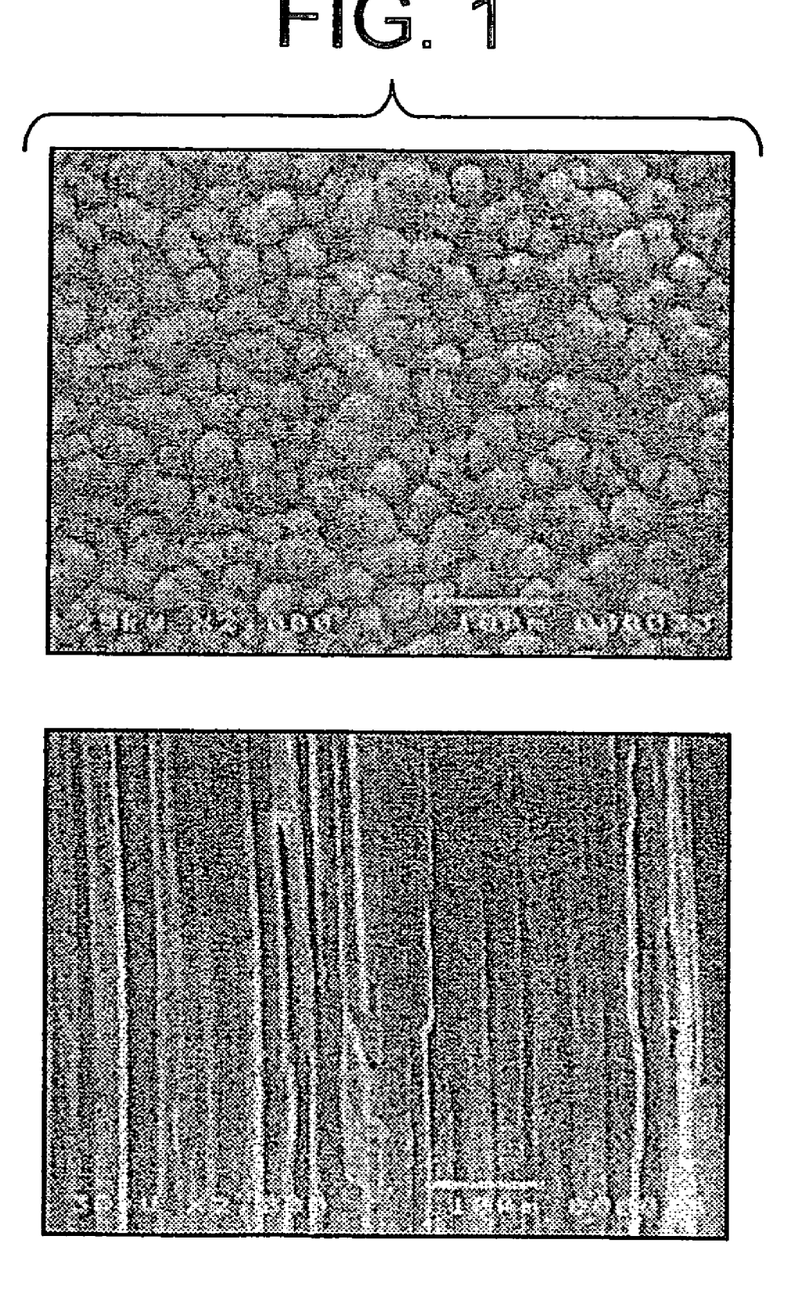
FIG. 1 shows two electron-microscopic photographs of one stimulable phosphor layer deposited by the method of the invention in which the upper photograph indicates a surface of the phosphor layer and the lower photograph indicates a section of the phosphor layer taken in the depth direction.
Figure 2:
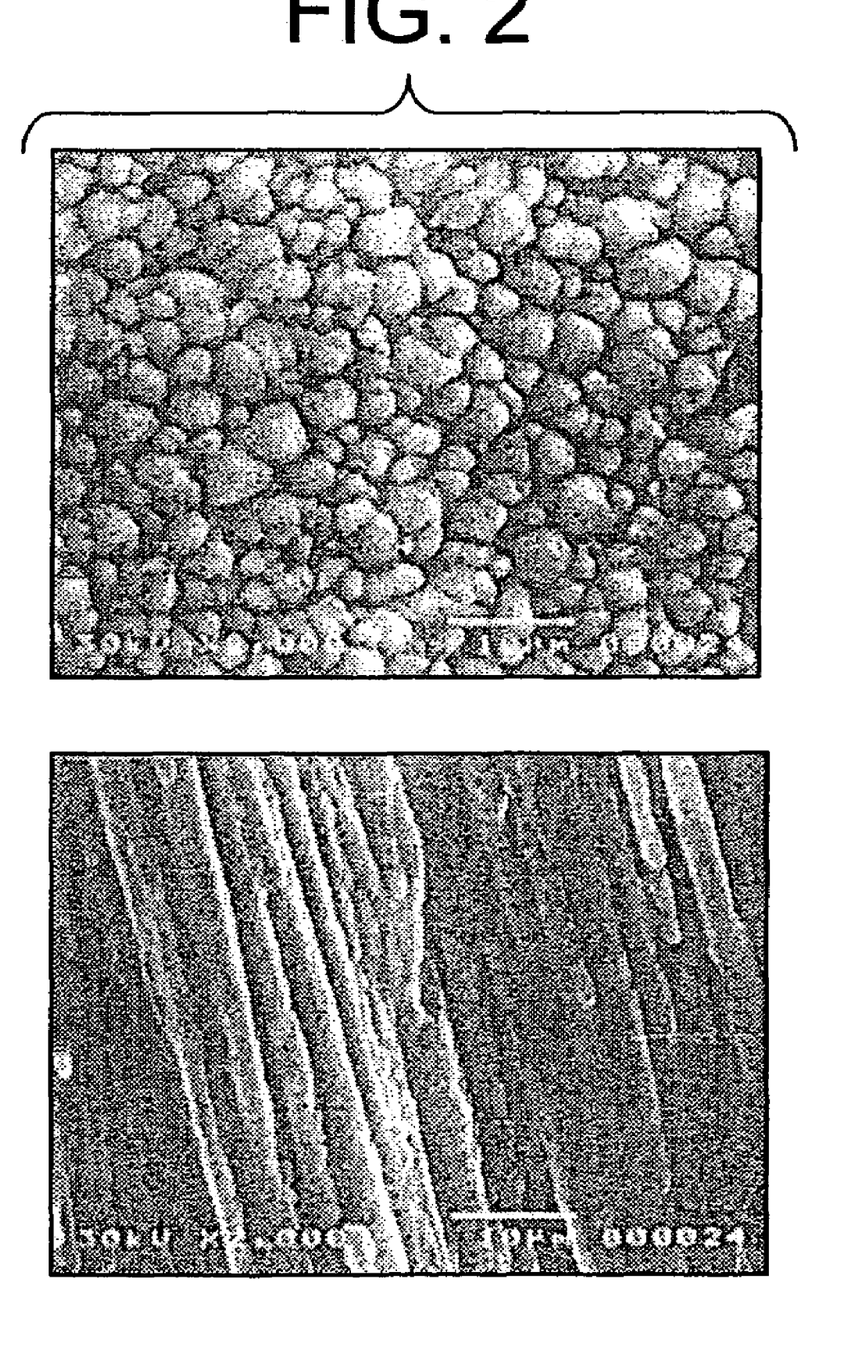
FIG. 2 shows two electron-microscopic photographs of another stimulable phosphor layer deposited by the method of the invention in which the upper photograph indicates a surface of the phosphor layer and the lower photograph indicates a section of the phosphor layer taken in the depth direction.
Figure 3:
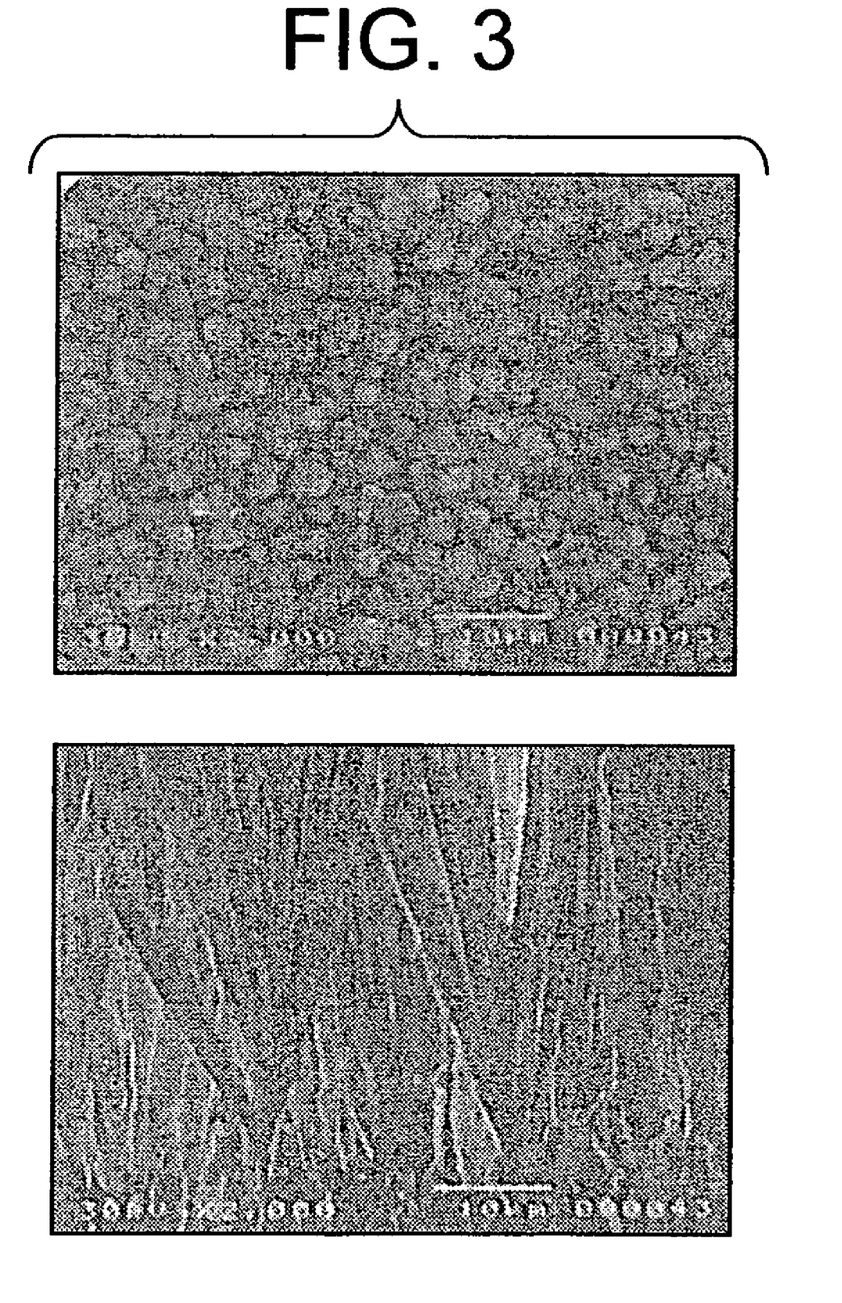
FIG. 3 shows two electron-microscopic photographs of a stimulable phosphor layer deposited by a comparative method in which the upper photograph indicates a surface of the phosphor layer and the lower photograph indicates a section of the phosphor layer taken in the depth direction.

FIGS. 1 and 2 show typical structures of the phosphor layer deposited by the method of the invention. The upper photographs of FIGS. 1 and 2 are of surfaces of the deposited phosphor layers. The lower photographs are of vertical sections of the deposited phosphor layers. The photographs clearly indicate that the columnar phosphor crystals are deposited with cracks (vacant spaces) between the adjoining columnar crystals. FIG. 3 shows a typical structures of the phosphor layer deposited at a higher accelerating voltage. The upper photograph and lower photograph of FIG. 3 are, respectively, those of the surface and vertical section. Apparently, the columnar phosphor crystals are deposited relatively at random.

Upon application of an electron beam, the phosphor material vaporizes and the vapor is then deposited on the surface of the support. The rate of deposition generally is 0.1 to 1,000 μm/min., preferably 1 to 100 μm/min.

The stimulable phosphor layer (or film) deposited on the support generally has a thickness in the range of 100 to 1 mm, preferably 200 to 700 μm. The phosphor layer may be composed of two or more layers, which are produced by applying the electron beam to the phosphor material intermittently. Otherwise, two or more electron guns are employed in combination to deposit two or more phosphor materials simultaneously.

The support on which the vaporized phosphor material is deposited is cooled before it is taken out of the vessel.

In the deposition process, the support is preferably heated by a thermal energy supplied by a heating means, and, after the deposition is complete, the supply of thermal energy from the heating means to the support is gradually reduced to cool the support gradually. Preferred is that the support is cooled at a rate in the range of 1° C./min. to 20° C./min., specifically at a rate in the range of 1° C./min. to 10° C./min.

The deposited stimulable phosphor layer can be further heated for annealing.

On the surface of the deposited phosphor layer, a protective cover film is preferably placed. In order not to affect the simulating rays or the stimulated emission, the cover film preferably is transparent. Further, for efficiently protecting the stimulable phosphor sheet from chemical deterioration and physical damage, the protective film should be both chemically stable and physically strong.

The cover film can be provided by fixing a beforehand prepared transparent plastic film (e.g., polyethylene terephthalate) on the stimulable phosphor sheet with adhesive, or by coating the phosphor sheet with a solution of cover film material and drying the coated solution.

It is preferred that the protective film is made of silicate glass or similar material which is deposited on the phosphor layer in a vacuum.

Into the cover film, fillers of fine particles may be incorporated so as to reduce blotches caused by interference and to improve the quality of the resultant radiation image. The thickness of the cover film generally is in the range of approx. 100 to 1,000 $\mu$m, preferably 200 to 500 $\mu$m, so as to effectively keep the deposited phosphor layer from moisture in the atmospheric surrounding For enhancing the resistance to staining, a fluororesin layer is preferably provided on the cover film. The fluororesin layer can be formed by coating the surface of the cover film with a solution of a fluororesin in an organic solvent, and drying the coated solution. The fluororesin may be used singly, but generally a mixture of the fluororesin and a film-forming resin is employed. In the mixture, an oligomer having polysiloxane structure or perfluoroalkyl group can be further added. Into the fluororesin layer, a filler of fine particles may be incorporated so as to reduce blotches caused by interference and to improve quality of the resulting radiation image. The thickness of fluororesin layer generally is in the range of 0.5 to 20 $\mu$m. In the formation of the fluororesin layer, additives such as a crosslinking agent, a film-hardening agent and an anti-yellowing agent can be used. In particular, the crosslinking agent advantageously improves durability of the fluororesin layer.

Figure 6:
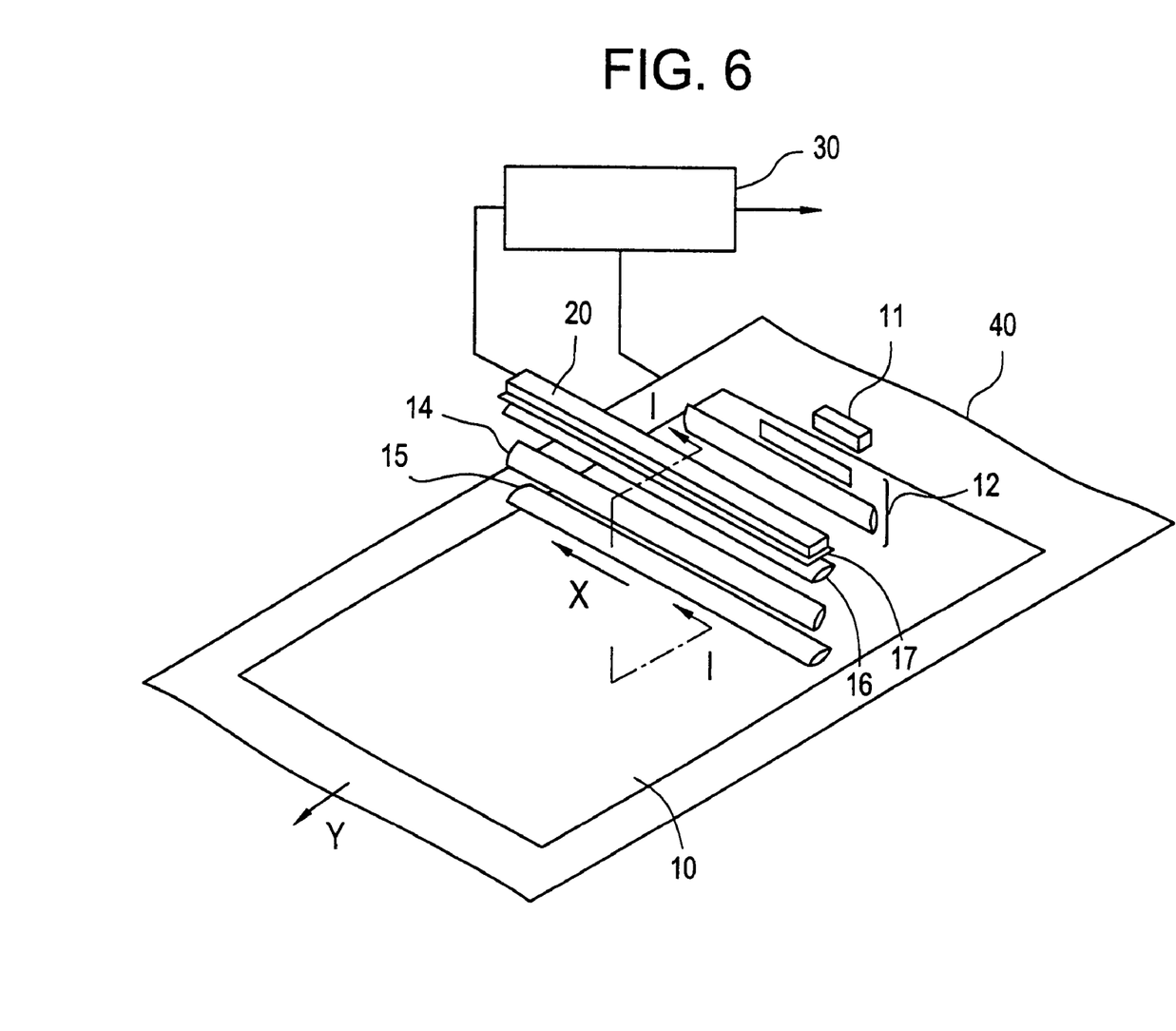
FIG. 6 illustrates an apparatus for reading a radiation image from a stimulable phosphor sheet.
Figure 7:
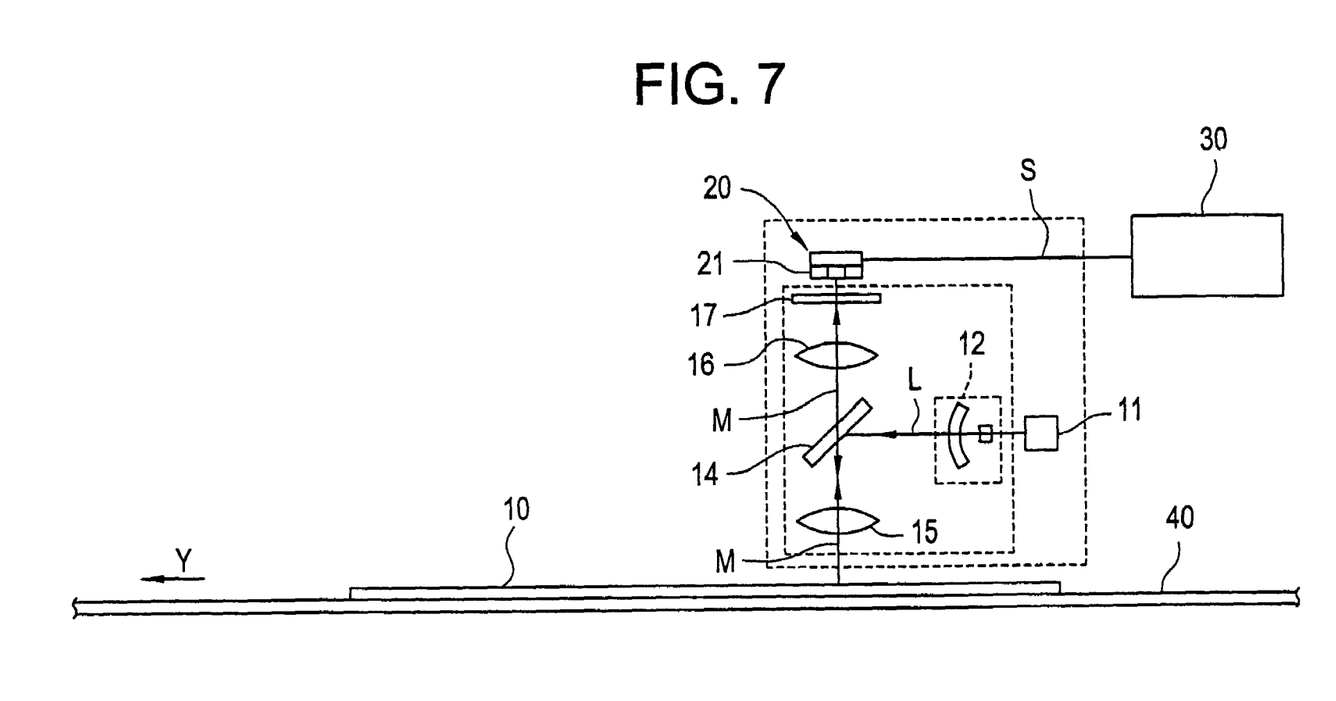
FIG. 7 is a section view taken along the I—I line in the apparatus of FIG. 6.

FIG. 6 illustrates an apparatus for reading a radiation image from a stimulable phosphor sheet, and FIG. 7 is a section view taken along the I—I line in the apparatus of FIG. 6.

The stimulable phosphor sheet 10 is placed on a conveyor belt 40 and moved In the direction of the arrow Y. The rate of movement of the phosphor sheet 10 is the same as that of the conveyor belt 40, and the rate of movement of the conveyor belt 40 is input into a radiation image reading controller 30.

A laser beam L is emitted from a broad area laser (BLD) 11, which then passes through an optical means 12 composed of collimater lens and toric lens to give a parallel beam. The parallel beam is reflected by a dichroic mirror 14 (which reflects a stimulating beam, while transmits a stimulated emission, and which is placed at an angle of 45° to the phosphor sheet) and then passes a first SELFOC lens (commercially available gradient index lens array) 15 to reach the phosphor sheet 10 vertically under linear scanning in a direction X which is almost perpendicular to the direction of movement of the belt 40.

Upon stimulation with a laser beam, the phosphor sheet 10 produces a stimulated emission M in an amount proportional to the radiation energy stored on the phosphor sheet. The stimulated emission M passes the first SELFOC lens 15 to give a parallel beam, passes the dichroic mirror 14, passes a second SELFOC lens 16, and reaches a light-receiving surface of a photo-electric conversion element 21 of a line sensor 20. The line sensor 20 is composed of a multiple of solid photo-electric conversion elements 21 which are arrange in the direction perpendicular to the movement of the conveyor belt 40.

Since the line sensor has a short focal depth, it is required that the distance between the line sensor 20 and the surface of the phosphor sheet 10 is kept constant. However, if the phosphor sheet 10 has a frame illustrated in FIGS. 4 and 5, the upper surface of the frame can be utilized as a referential surface to adjust the distance between the line sensor 20 and the surface of the phosphor sheet 10.

A portion of the laser beam (i.e., stimulating beam) which is reflected on the surface of the phosphor sheet 10 and passes the second SELFOC lens 16 is cut off by a stimulating beam cut filter 17.

The stimulated emission M is then converted in each photo-electric conversion element 21 to give a set of signals S. The signals S are then input into the radiation image reading controller 30. In the controller 30, the signals S are processed taking the moving rate of the conveyor into account, to output radiation image data on an image display (not illustrated).

The radiation image reading system employable for reading a radiation image stored in the stimulable phosphor sheet of the invention is not limited to that illustrated in FIGS. 6 and 7. Other known reading systems are also utilizable.

The present invention is further described by the following examples.

EXAMPLE 1

(1) Preparation of Phosphor Material for Deposition

Cesium bromide (CsBr, 100 g, 0.47 mol.) and europium bromide (EuBr, 31.8404 g, 4.7×10$^{-3}$ mol.) were mixed and pulverized in a mortar, and then placed in a stirring vibrator for 15 min. The resulting mixture was placed in a heating furnace. The gas contained in the furnace was evacuated, and a nitrogen gas was introduced into the furnace. The mixture was then heated for firing in the furnace at 525° C. for 2 hours. The furnace was evacuated for 15 minutes, after the firing was complete.

The resulting stimulable europium activated cesium bromide (CsBr:0.01Eu) phosphor was pulverized in a mortar, and the pulverized phosphor was compressed at 800 kg/cm$^2$, to produce a pellet for deposition. The pellet was then placed in an evacuating vessel at 150° C. for 2 hours, for degassing.

The resulting pellet had a density of 3.6 g/cm$^3$, which corresponded to a relative density of 81%.

(2) Deposition of Phosphor Material on Support

In a depositing apparatus, an aluminum sheet (support) and the phosphor pellet produced above were placed at the predetermined sites. The apparatus was evacuated to reach a pressure of 4.0×10⁻⁹ kg/cm². Then, the support was heated to 300° C. by a heater of 400° C.

To the phosphor pellet was applied an electron beam from an electron gun at 60 W and at an accelerating voltage of 2.3 kV for 20 min. The phosphor was vaporized and deposited on the aluminum sheet at a rate of 25 μm/min.

After the deposition was complete, the support was gradually cooled by decreasing an output of the heater. The rate of cooling was 1° C./min. When the inside of the furnace reached 250° C., an air was introduced into the apparatus, and the aluminum sheet was taken out of the apparatus.

On the aluminum sheet were deposited columnar phosphor crystals vertically o to the sheet to form a stimulable phosphor layer of 450 μm thick. The length and width of the columnar crystal is approx. 450 μm and approx. 3 μm, respectively. The photographs of the produced stimulable phosphor layer are shown in FIG. 1.

Thus, a stimulable phosphor sheet composed of a support and a deposited stimulable phosphor layer was prepared.

EXAMPLE 2

The procedures of Example 1 were repeated except that the application of electron beam was performed at an accelerating voltage of 4.0 kV.

The photographs of FIG. 2 show the plane view and the section view of the produced stimulable phosphor layer.

EXAMPLE 3

The procedures of Example 2 were repeated except that the pellet of the phosphor material was produced by compression at 900 kg/cm². The resulting pellet had a density of 4.0 g/cm³, which corresponded to a relative density of 90%.

EXAMPLE 4

The procedures of Example 2 were repeated except that the pellet of the phosphor material was produced by compression at 950 kg/cm². The resulting pellet had a density of 4.2 g/cm³, which corresponded to a relative density of 95%.

COMPARISON EXAMPLE 1

The procedures of Example 1 were repeated except that the application of electron beam was performed at an accelerating voltage of 10.0 kV.

COMPARISON EXAMPLE 2

The procedures of Example 1 were repeated except that the application of electron beam was performed at an accelerating voltage of 6.0 kV.

The photographs of FIG. 3 show the plane view and the section view of the produced stimulable phosphor layer.

COMPARISON EXAMPLE 3

The procedures of Example 1 were repeated except that the application of electron beam was performed at an accelerating voltage of 1.0 kV.

COMPARISON EXAMPLE 4

The procedures of Example 1 were repeated except that the application of electron beam was performed at an accelerating voltage of 0.3 kV.

COMPARISON EXAMPLE 5

The procedures of Example 2 were repeated except that the fired powdery phosphor material as such was vaporized in the deposition procedure.

COMPARISON EXAMPLE 6

The procedures of Example 2 were repeated except that the pellet of the phosphor material was produced by compression at 700 kg/cm². The resulting pellet had a density of 3.0 g/cm³, which corresponded to a relative density of 68%.

Evaluation of Stimulable Phosphor Sheet

The stimulable phosphor sheets were evaluated in the following items:

(1) Appearance and Conditions of Each Columnar Phosphor Crystal on Support

The shapes of columnar crystals, presence of nodes in the columnar crystals, and agglutination of columnar crystals are checked on the electron-microscopic photographs. Linear crystals having no nodes and free from agglutination are better.

(2) Conditions of Whole Columnar Phosphor Crystals on Support

Whether the columnar crystals are aligned neatly or not is checked on the electron-microscopic photographs.

(3) Appearance of Deposited Stimulable Phosphor Layer

Roughness of the surface of the deposited layer is visually checked. Smooth surface is better.

(4) Adhesion of Deposited Phosphor Layer to Support

Whether the deposited phosphor layer is well fixed to the support or not is checked.

The results are marked referring to the following ranks:
The results are set forth in Table 1.

TABLE 1

|  | Columnar crystals | | Phosphor layer | |
| --- | --- | --- | --- | --- |
|  | (1) | (2) | (3) | (4) |
| Example 1 | AA | AA | A | A |
| Example 2 | AA | AA | A | A |
| Example 3 | AA | AA | A | A |
| Example 4 | AA | AA | A | A |
| Com. Ex. 1 | — | — | — | — |
| Com. Ex. 2 | A | B | A | A |
| Com. Ex. 3 | A | C | A | A |
| Com. Ex. 4 | — | — | — | — |
| Com. Ex. 5 | B | B | C | B |
| Com. Ex. 6 | B | B | B | B |

Remarks:
In Com. Ex. 1, the phosphor material in the form of a pellet so rapidly evaporated as not to deposit on a support. In Com. Ex. 4. constant emission of the electron beam was not accomplished.
AA: Excellent
A: Good
B: Less satisfactory
C: Bad

EXAMPLE 5

The procedures of Example 1 were repeated except that the support was gradually cooled at a cooling rate of 10° C./min. by decreasing an output of the heater, after the deposition was complete. The condition of the resulting phosphor layer was B (less satisfactory), and the fixation of the deposited layer to the support was A (good).

EXAMPLE 6

The procedures of Example 1 were repeated except that the support was gradually cooled at a cooling rate of 20° C./min. by decreasing an output of the heater, after the deposition was complete. The condition of the resulting phosphor layer was B (less satisfactory), and the fixation of the deposited layer to the support was B (less satisfactory).

EXAMPLE 7

The procedures of Example 1 were repeated except that a quartz sheet was used as the support.

The condition of the resulting phosphor layer was A (good), and the fixation of the deposited layer to the support was A (good).

EXAMPLE 8

The procedures of Example 5 were repeated except that a quartz sheet was used as the support.

The condition of the resulting phosphor layer was A (good), and the fixation of the deposited layer to the support was A (good).

EXAMPLE 9

The procedures of Example 6 were repeated except that a quartz sheet was used as the support.

The condition of the resulting phosphor layer was B (less satisfactory), and the fixation of the deposited layer to the support was A (good).

What is claimed is:

1. A stimulable phosphor sheet comprising a support and a vapor deposited stimulable phosphor layer, and a protective silicate glass film, wherein the support has a frame unitedly protruded from a circumference of the support, the phosphor layer is enclosed with the frame, and the protective silicate glass film is airtightly sealed to the frame.

2. The stimulable phosphor sheet of claim 1, wherein the support is made of quartz or metal.

3. The stimulable phosphor sheet of claim 1, wherein the stimulable phosphor is a stimulable alkali metal halide phosphor having an essential composition of the formula (1):

$$M^I X . a M^{II} X'_2 . b M^{III} X''_3 : zA \qquad (I)$$

in which $M^I$ represents at least one alkali metal selected from the group consisting of Li, Na, K, Rb and Cs; $M^{II}$ represents at least one divalent metal selected from the group consisting of Be, Mg, Ca, Sr, Ba, Ni, Cu, Zn and Cd; $M^{III}$ represents at least one trivalent metal selected from the group consisting of Sc, Y, La, Ce, Pr, Nd, Pm, Sm, Eu, Gd, Tb, Dy, Ho, Er, Tm, Yb, Lu, Al, Ga and In; each of X, X', and X" independently represents at least one halogen atom selected from the group consisting of F, Cl, Br and I; A represents at least one metal selected from the group consisting of Y, Ce, Pr, Nd, Sm, Eu, Gd, Tb, Dy, Ho, Er, Tm, Yb, Lu, Na, Mg, Cu, Ag, Tl and Bi; and each of a, b and z is a number respectively satisfying the conditions of $0 \leq a < 0.5$, $0 \leq b < 0.5$ $0 \leq z < 0.2$.

4. A method for preparing a stimulable phosphor sheet of claim 1, comprising the steps of:

applying an electron beam to a stimulable phosphor or a source thereof in a vacuum to vaporize the phosphor or the source and depositing the vaporized phosphor or source on a support having a frame unitedly protruded from a circumference of the support in the area surrounded by the frame, and providing a protective film on the phosphor layer and the frame of the support so as to airtightly seal a space surrounded by the frame.

5. The method of claim 4, wherein the electron beam is applied to the stimulable phosphor or source thereof which is in the form of a solid having a relative density in the range of 80% to 98%, at an accelerating voltage in the range of 1.5 kV to 5.0 kV.

* * * * *